(12) United States Patent
Lin et al.

(10) Patent No.: US 12,519,399 B2
(45) Date of Patent: Jan. 6, 2026

(54) PRIMARY-SIDE CONTROLLER APPLIED TO A POWER CONVERTER AND OPERATIONAL METHOD

(71) Applicant: Leadtrend Technology Corp., Hsinchu County (TW)

(72) Inventors: Chao-Chih Lin, Hsinchu County (TW); Ming-Chang Tsou, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 155 days.

(21) Appl. No.: 18/407,488

(22) Filed: Jan. 9, 2024

(65) Prior Publication Data

US 2024/0243653 A1 Jul. 18, 2024

Related U.S. Application Data

(60) Provisional application No. 63/439,583, filed on Jan. 18, 2023.

(51) Int. Cl.
*H02M 3/335* (2006.01)
*H02M 1/00* (2007.01)
*H02M 3/00* (2006.01)

(52) U.S. Cl.
CPC ......... *H02M 3/33592* (2013.01); *H02M 3/01* (2021.05); *H02M 3/33523* (2013.01); *H02M 3/33571* (2021.05); *H02M 1/0058* (2021.05)

(58) Field of Classification Search
CPC .. H02M 1/0058; H02M 3/01; H02M 3/33523; H02M 3/33571; H02M 3/33592
See application file for complete search history.

(56) References Cited

U.S. PATENT DOCUMENTS

| | | | | |
|---|---|---|---|---|
| 9,991,803 B1* | 6/2018 | Wang | ...................... | H02M 1/14 |
| 2017/0324345 A1* | 11/2017 | Stuler | ...................... | H02M 1/08 |
| 2020/0287457 A1* | 9/2020 | Su | .......................... | H02M 3/01 |

* cited by examiner

*Primary Examiner* — Jue Zhang
(74) *Attorney, Agent, or Firm* — Winston Hsu

(57) ABSTRACT

A primary-side controller applied to a power converter is used for controlling a frequency of a gate control signal according to a grouping mode. The primary-side controller includes a first counter, a second counter, an adjuster, a gate control signal generation circuit, and a logic circuit. The first counter generates a first signal according to the gate control signal and a predetermined number. The second counter generates a second signal according to a clock signal and the predetermined number. The adjuster determines whether to adjust the predetermined number according to the second signal, the predetermined number, and a frequency of the clock signal. The logic circuit generates a reset signal to the first counter and the second counter and an enable signal to the gate control signal generation circuit according to the first signal, the second signal, and the gate control signal.

19 Claims, 6 Drawing Sheets

PRIMARY-SIDE CONTROLLER APPLIED TO A POWER CONVERTER AND OPERATIONAL METHOD

CROSS REFERENCE TO RELATED APPLICATIONS

This application claims the benefit of U.S. Provisional Application No. 63/439,583, filed on Jan. 18, 2023. The content of the application is incorporated herein by reference.

BACKGROUND OF THE INVENTION

1. Field of the Invention

The present invention relates to a primary-side controller applied to a power converter and an operational method thereof, and particularly to a primary-side controller and an operational method thereof that can control a frequency of a gate control signal of a power converter according to a grouping mode.

2. Description of the Prior Art

In the prior art, when a power converter (e.g. an asymmetric half-bridge (AHB) power converter or an active-clamp flyback (ACF) power converter) operates in a critical conduction mode (CRM), the power converter can implement zero-voltage (or low-voltage) switching and has lower switching loss. However, if the power converter only operates in the critical conduction mode, a frequency of a gate control signal (corresponding to a main switch of a primary side of the power converter) will be increased with decrease of a load, resulting in switching loss and core loss of a transformer of the power converter being increased to make the power converter have lower conversion efficiency when the load is light. However, if let the power converter operate in a discontinuous conduction mode (DCM) when the load is light, although the frequency of the gate control signal can be reduced, the power converter will lose a characteristic of zero-voltage (or low-voltage) switching. Nowadays, in high-frequency applications, even if the power converter operates in the discontinuous conduction mode when the load is light, the frequency of the gate control signal is still high (e.g. 150 KHz), and thus the power converter will have higher switching loss to cause the main switch to heat up when the load is light.

Therefore, how to solve the above-mentioned disadvantages of the prior art has become an important issue of a designer of a primary-side controller.

SUMMARY OF THE INVENTION

An embodiment of the present invention provides a primary-side controller applied to a power converter, wherein the primary-side controller controls a frequency of a gate control signal according to a grouping mode. The primary-side controller includes a first counter, a second counter, an adjuster, a gate control signal generation circuit, and a logic circuit. The first counter is used for generating a first signal when a number of multiple gate control signals is equal to a predetermined number. The second counter is used for generating a second signal when a number of multiple clock signals is equal to the predetermined number. The adjuster is coupled to the second counter, wherein the adjuster detects a frequency of the multiple clock signals and decides whether to adjust the predetermined number according to the second signal, the predetermined number, and the frequency of the multiple clock signals. The gate control signal generation circuit is used for generating the multiple gate control signals. The logic circuit is coupled to the first counter, the second counter, and the gate control signal generation circuit, wherein the logic circuit generates a reset signal to the first counter and the second counter and an enable signal to the gate control signal generation circuit accord to the first signal, the second signal, and a last gate control signal of the multiple gate control signals.

Another embodiment of the present invention provides an operational method of a primary-side controller applied to a power converter, wherein the primary-side controller includes a first counter, a second counter, an adjuster, a gate control signal generation circuit, and a logic circuit. The operational method includes starting group counting of gate control signals; if an average switching frequency determined by a predetermined number and a frequency of multiple clock signals is greater than a predetermined frequency range when a number of multiple gate control signals is equal to the predetermined number and a number of the multiple clock signals is equal to the predetermined number; and adjusting the predetermined number when the average switching frequency is less than the predetermined frequency range.

The present invention provides a primary-side controller applied to a power converter and an operational method thereof. The primary-side controller and the operational method can control a frequency of a gate control signal according to a grouping mode, wherein one of multiple gate control signals in the same group corresponds to a discontinuous conduction mode and other gate control signals of the multiple gate control signals correspond to a critical conduction mode. Therefore, compared to the prior art, the present invention can make the power converter not only realize zero-voltage (or low-voltage) switching when a load is heavy, but also reduce an average switching frequency to increase conversion efficiency of the power converter when the load is light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
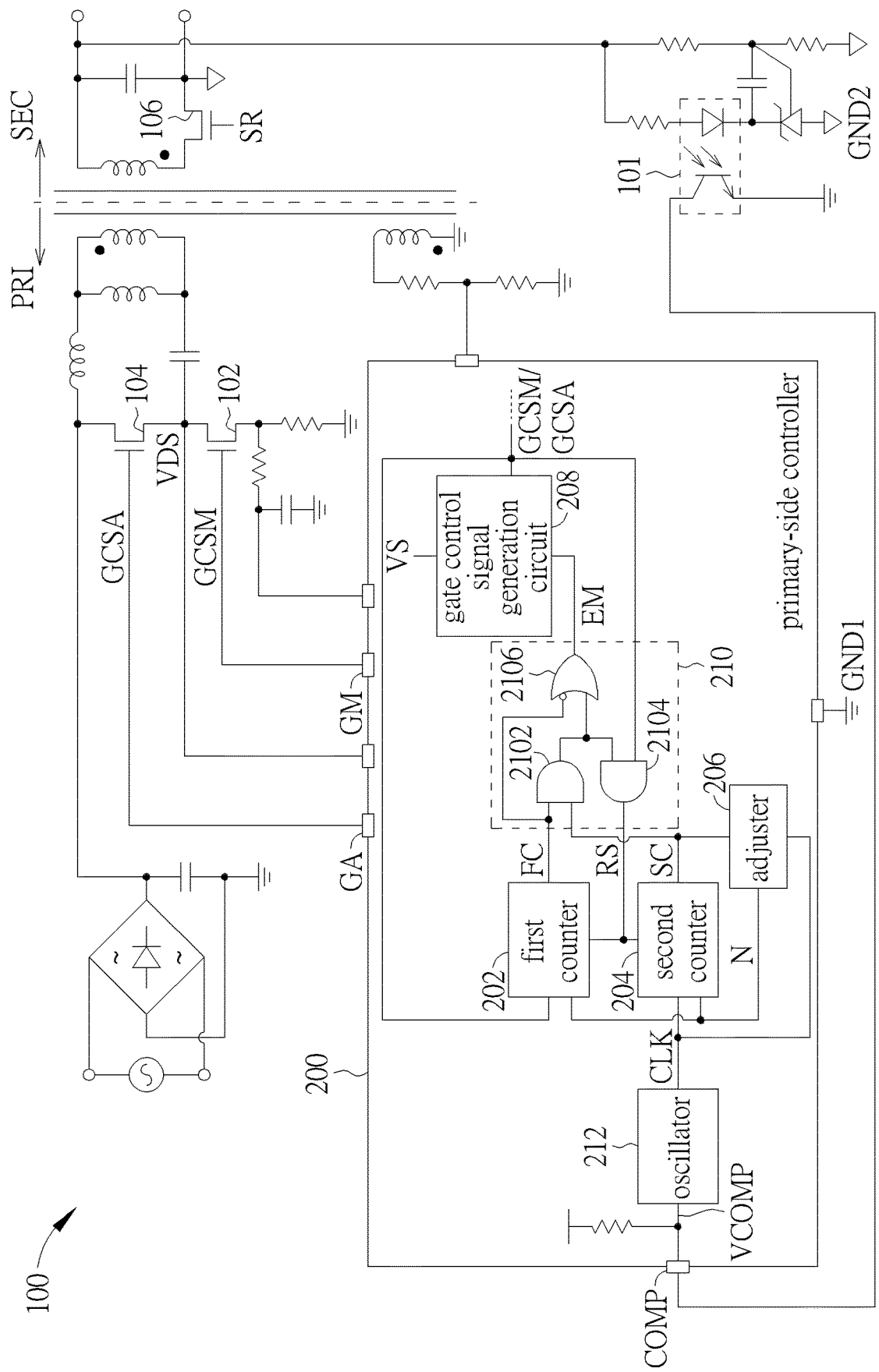
FIG. 1 is a diagram illustrating a primary-side controller applied to a power converter according to a first embodiment of the present invention.

Please refer to FIG. 1. FIG. 1 is a diagram illustrating a primary-side controller 200 applied to a power converter 100 according to a first embodiment of the present invention, wherein the primary-side controller 200 can control a frequency of a gate control signal GCSM according to a grouping mode, the gate control signal GCSM is used for controlling turning-on of a main switch 102 installed at a primary side PRI of the power converter 100, the gate control signal GCSM is a pulse width modulation (PWM) signal, and the primary-side controller 200 is also installed at the primary side PRI of the power converter 100. In addition, in one embodiment of the present invention, the power converter 100 can be an active-clamp flyback (ACF) power converter or an asymmetric half-bridge (AHB) flyback power converter. In addition, in another embodiment of the present invention, the power converter 100 can be a quasi-resonance flyback power converter or a zero-voltage switching flyback power converter. In addition, as shown in FIG. 1, the primary-side controller 200 includes a first counter 202, a second counter 204, an adjuster 206, a gate control signal generation circuit 208, a logic circuit 210, and an oscillator 212, the logic circuit 210 includes a first AND gate 2102, a second AND gate 2104, and an OR gate 2106, wherein coupling relationships between the first counter 202, the second counter 204, the adjuster 206, the gate control signal generation circuit 208, the logic circuit 210, the first AND gate 2102, the second AND gate 2104, and the OR gate 2106 can be referred to FIG. 1, so further description thereof is omitted for simplicity. In addition, ground potential GND1 of the primary side PRI of the power converter 100 is different from ground potential GND2 of a secondary side SEC of the power converter 100. In addition, the primary side PRI of the power converter 100 is isolated from the secondary side SEC of the power converter 100 by a photo-coupler 101.

Figure 2:
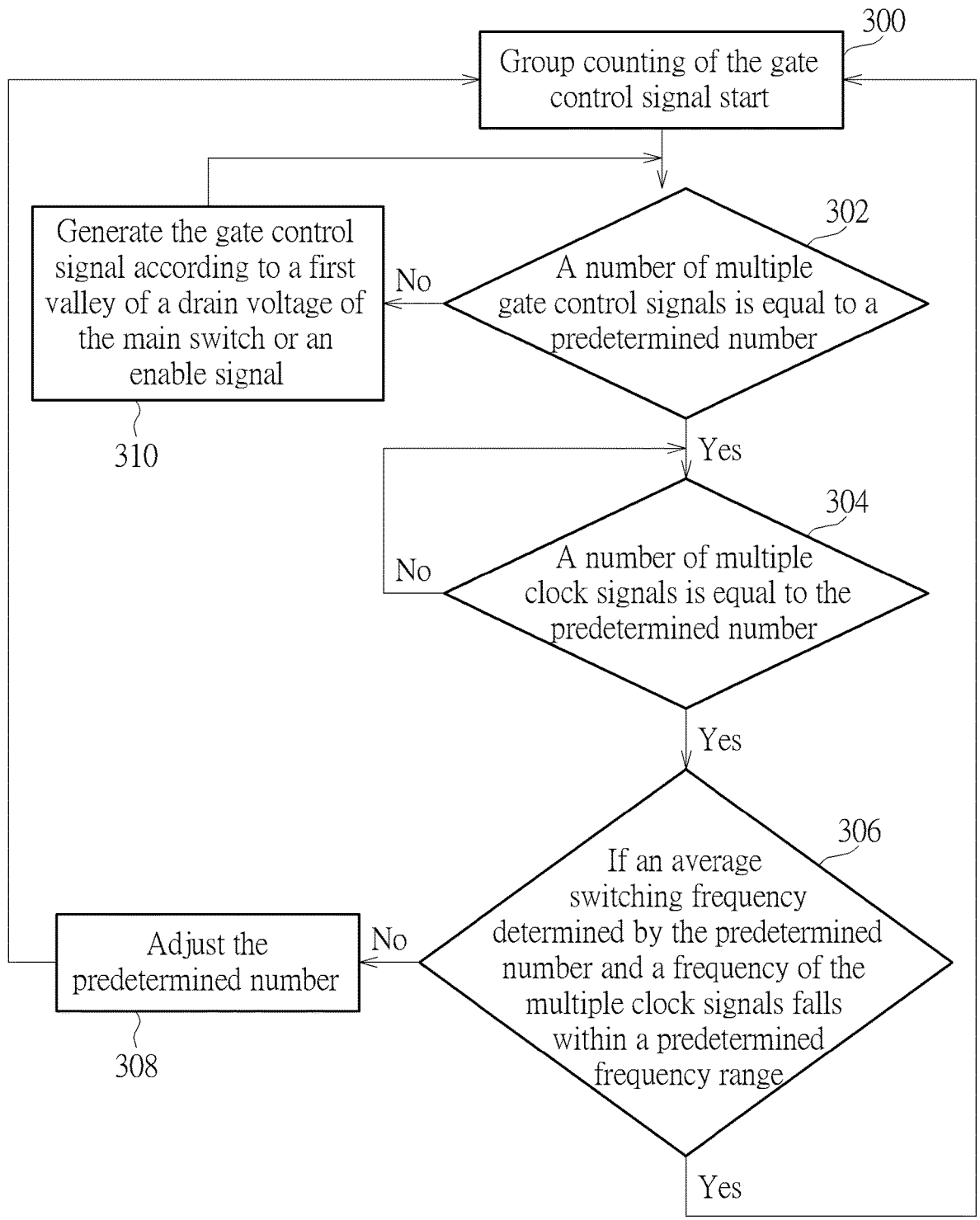
FIG. 2 is a flowchart illustrating an operational method of the primary-side controller applied to the power converter according to a second embodiment of the present invention.

In addition, please refer to FIG. 1, FIG. 2, FIG. 3, FIG. 4, FIG. 5, and FIG. 6, wherein the FIG. 2 is a flowchart illustrating an operational method of the primary-side controller 200 applied to the power converter 100 according to a second embodiment of the present invention. The operational method in FIG. 2 is illustrated using the power converter 100 and the primary-side controller 200 in FIG. 2. Detailed steps are as follows:

Step 300: Group counting of the gate control signal GCSM start.
Step 302: A number of multiple gate control signals GCSM is equal to a predetermined number N; if yes, go to Step 304; if no, go to Step 310.
Step 304: A number of multiple clock signals CLK is equal to the predetermined number N; if yes, go to Step 306; if no, go to Step 304 again.
Step 306: If an average switching frequency determined by the predetermined number N and a frequency of the multiple clock signals CLK falls within a predetermined frequency range; if yes, go to Step 300; if no, go to Step 308.
Step 308: Adjust the predetermined number N, go to Step 300.
Step 310: Generate the gate control signal GCSM according to a first valley of a drain voltage VDS of the main switch 102 or an enable signal EM, go to Step 302.

Figure 3:
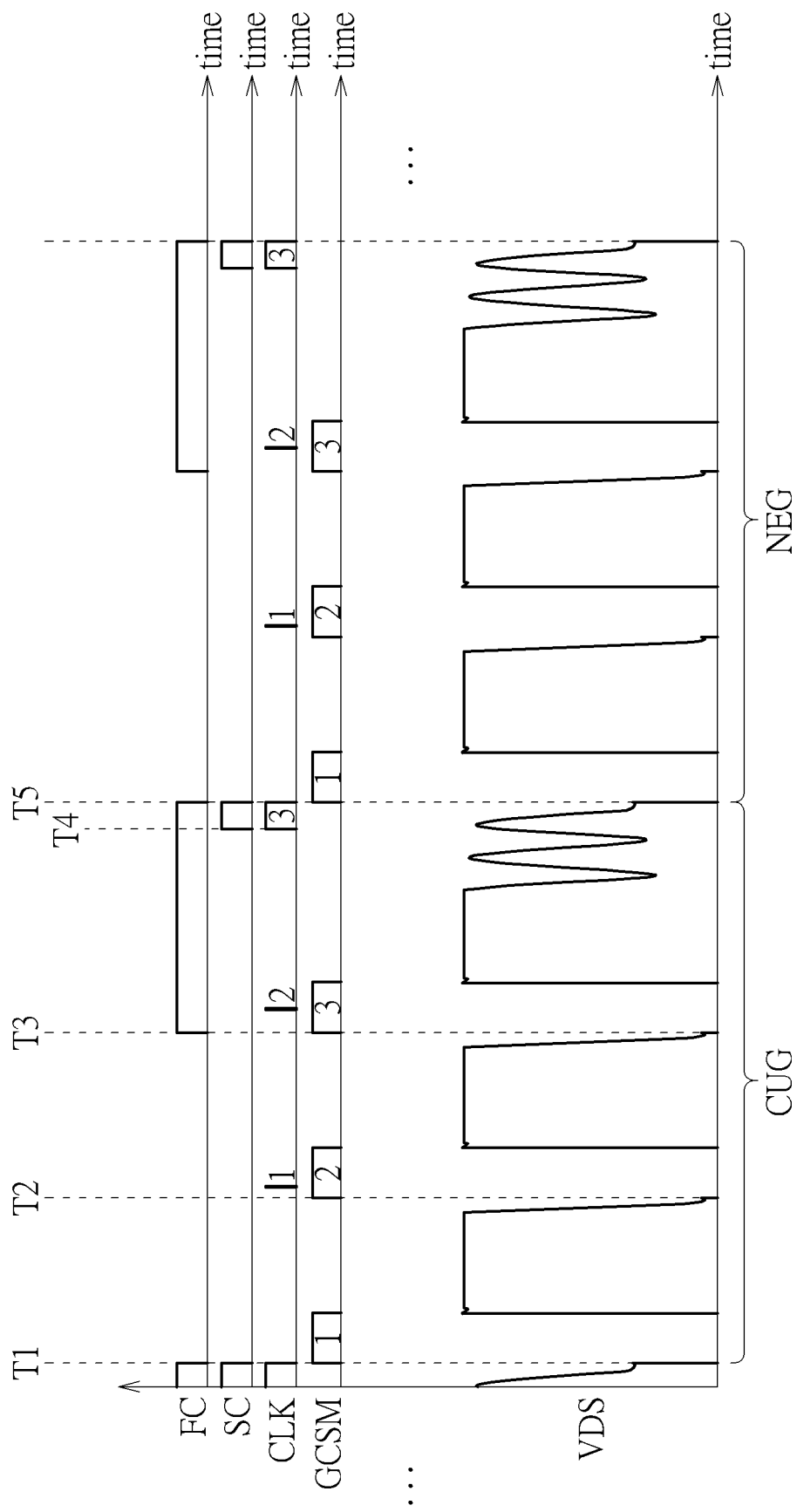
FIG. 3, FIG. 4, FIG. 5, FIG. 6 are diagrams illustrating waveforms of the first signal, the second signal, the clock signal, the gate control signal, and the drain voltage under different predetermined numbers.

Take the predetermined number N being equal to 3 as an example:

In Step 300, please simultaneously refer to FIG. 1 and FIG. 3. The oscillator 212 can generate the clock signal CLK according to a feedback compensation voltage VCOMP, wherein the oscillator 212 receives the feedback compensation voltage VCOMP from a pin COMP of the primary-side controller 200, and the feedback compensation voltage VCOMP is changed with variation of a load (not shown in FIG. 1) coupled to the secondary side SEC of the power converter 100. That is to say, a frequency of the clock signal CLK is changed with variation of the load. As shown in FIG. 3, at a time T1, a current group CUG starts, so the gate control signal generation circuit 208 generates the gate control signal GCSM (label "1") according to the enable signal EM corresponding to a previous group, wherein the drain voltage VDS of the main switch 102 can be changed with variation of the gate control signal GCSM, and the gate control signal generation circuit 208 transmits the gate control signal GCSM to a gate of the main switch 102 through a pin GM of the primary-side controller 200. In addition, the enable signal EM of the previous group corresponds to a discontinuous conduction mode (DCM) and further corresponds to a valley (not the first valley) of the drain voltage VDS (e.g. in the previous group, the enable signal EM corresponds to a third valley of the drain voltage VDS). In addition, as shown in FIG. 3, the gate control signal GCSM and a gate control signal GCSA (not shown in FIG. 3) which controls turning-on of an auxiliary switch 104 installed at the primary side PRI of the power converter 100 are not simultaneously turned on. As shown in FIG. 3, at a time T2, a valley detection circuit (not shown in FIG. 1) within the primary-side controller 200 can generate a valley detection signal VS to the gate control signal generation circuit 208 according to the first valley of the drain voltage VDS, and the gate control signal generation circuit 208 can generate the gate control signal GCSM (label "2") according to the valley detection signal VS, wherein meanwhile the valley detection signal VS corresponds to a critical conduction mode (CRM). Similarly, as shown in FIG. 3, at a time T3, the valley detection circuit can generate the valley detection signal VS to the gate control signal generation circuit 208 according to the first valley of the drain voltage VDS, and the gate control signal generation circuit 208 can generate the gate control signal GCSM (label "3") according to the valley detection signal VS, wherein meanwhile the valley detection signal VS still corresponds to a critical conduction mode (CRM).

In Step 304 to Step 308, as shown in FIG. 3, after the time T3, because the predetermined number N is equal to 3 and the first counter 202 has been counted 3 gate control signals GCSM (corresponding to label "1", label "2", label "3", respectively), the first counter 202 generates a first signal FC. As further shown in FIG. 3, at a time T4, the second counter 204 also has been counted 3 clock signals CLK, so the second counter 204 generates a second signal SC. As shown in FIG. 1, the adjuster 206 can detect the frequency of the clock signal CLK corresponding to the current group CUG, and determine an average switching frequency according to the second signal SC, the predetermined number N, and the frequency of the clock signal CLK corresponding to the current group CUG (because the predetermined number N is equal to 3, the average switching frequency is equal to the frequency of the clock signal CLK corresponding to the current group CUG divided by the predetermined number N, that is, the average switching frequency is equal to the frequency of the clock signal CLK corresponding current group CUG divided by 3), wherein when the average switching frequency falls within the predetermined frequency range, the adjuster 206 does not adjust the predetermined number N. However, when the average switching frequency is greater than the predetermined frequency range (e.g. greater than 20 KHz), the adjuster 206 increases the predetermined number N due to reducing switching loss to make a number of zero-voltage (or low-voltage) switching be increased. In addition, when the average switching frequency is less than the predetermined frequency range (e.g. less than 20 KHz), meanwhile the adjuster 206 will decrease the predetermined number N to make the average switching frequency greater than the predetermined frequency range because output ripple voltages of the power converter 100 are too large. In addition, in another embodiment of the present invention, the adjuster 206 compares frequencies of N clock signals CLK with the predetermined frequency range, not limited to the average switching frequency.

Then, in Step 310, please simultaneously refer to FIG. 1 and FIG. 3. At a time T5 (corresponding to the third valley of the drain voltage VDS), the logic circuit 210 can generate a reset signal RS to the first counter 202 and the second counter 204 and generate the enable signal EM to the gate control signal generation circuit 208 according to the first signal FC, the second signal SC, and the gate control signal GCSM (label "3"), so at the time T5, the first counter 202 and the second counter 204 will be reset to zero according to the reset signal RS, and the gate control signal generation circuit 208 will generate the gate control signal GCSM (label "1") corresponding to a next group NEG according to the enable signal EM. Afterward, if the adjuster 206 does not adjust the predetermined number N, the primary-side controller 200 will repeat the above-mentioned operation of the current group CUG in the next group NEG. In addition, the present invention is not limited to the configuration of the logic circuit 210 shown in FIG. 1, that is, any a configuration of a logic circuit in which the above-mentioned functions of the logic circuit 210 can be realized falls within the scope of the present invention. In addition, timings of the first signal FC, the second signal SC and the clock signal CLK can be referred to FIG. 3.

Any a configuration of a logic circuit in which the above-mentioned functions of the logic circuit 210 can be realized falls within the scope of the present invention. In addition, timings of the first signal FC, the second signal SC and the clock signal CLK can be referred to FIG. 3.

In addition, one of skilled in the art should know to realize effect of zero-voltage switching through the gate control signal GCSA which is used for controlling turning-on of the auxiliary switch 104, and the gate control signal generation circuit 208 transmits the gate control signal GCSA to a gate of the auxiliary switch 104 through a pin GA of the primary-side controller 200.

Therefore, as shown in FIG. 3, in the current group CUG, because the gate control signal GCSM (label "1") corresponds to the discontinuous conduction mode, and the gate control signal GCSM (label "2") and the gate control signal GCSM (label "3") correspond to the critical conduction mode, the power converter 100 can not only realize zero-voltage (or low-voltage) switching when the load is heavy, but can also reduce the switching loss to increase conversion efficiency of the power converter 100 when the load is light.

Figure 4:
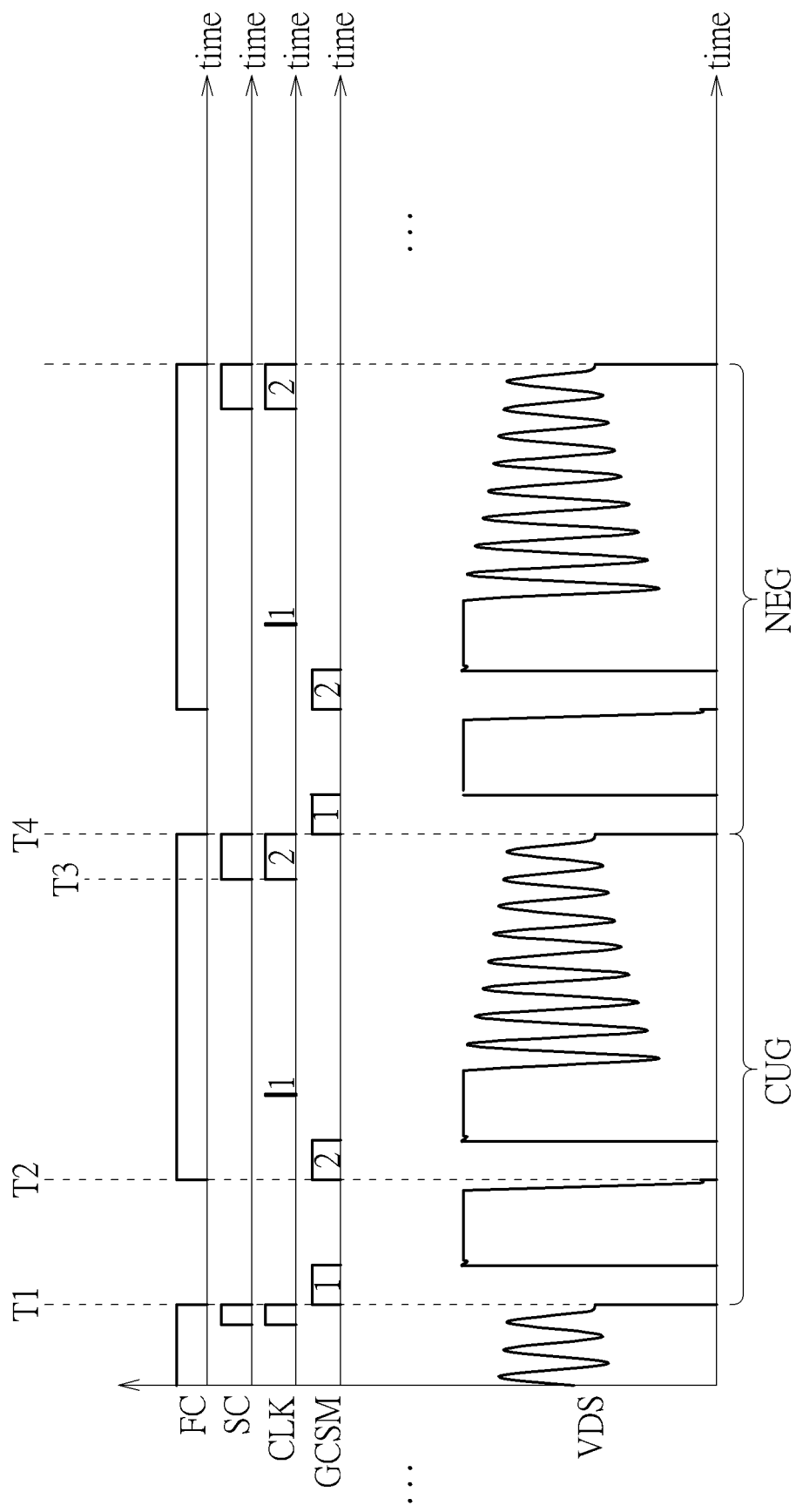

In addition, take the predetermined number N being equal to 2 as an example:

In Step 300, please simultaneously refer to FIG. 1 and FIG. 4. As shown in FIG. 4, at the time T1, the current group CUG starts, so the gate control signal generation circuit 208 generates the gate control signal GCSM (label "1") according to the enable signal EM corresponding to the previous group. In addition, the enable signal EM of the previous group corresponds to the discontinuous conduction mode and further corresponds to a valley (not the first valley) of the drain voltage VDS (e.g. in the previous group, the enable signal EM corresponds to a ninth valley of the drain voltage VDS). As shown in FIG. 4, at the time T2, the valley detection circuit (not shown in FIG. 1) within the primary-side controller 200 can generate the valley detection signal VS to the gate control signal generation circuit 208 according to the first valley of the drain voltage VDS, and the gate control signal generation circuit 208 can generate the gate control signal GCSM (label "2") according to the valley detection signal VS, wherein meanwhile the valley detection signal VS corresponds to the critical conduction mode.

In Step 304 to Step 308, as shown in FIG. 4, after the time T2, because the predetermined number N is equal to 2 and the first counter 202 has been counted 2 gate control signals GCSM (corresponding to label "1", label "2", respectively), the first counter 202 generates the first signal FC. As further shown in FIG. 4, at the time T3, the second counter 204 has been counted 2 clock signals CLK, so the second counter 204 generates the second signal SC. As shown in FIG. 1, the adjuster 206 can determine the average switching frequency according to the second signal SC, the predetermined number N, and the frequency of the clock signal CLK corresponding to the current group CUG (because the predetermined number N is equal to 2, the average switching frequency is equal to the frequency of the clock signal CLK corresponding to the current group CUG divided by the predetermined number 2), wherein the following operation of the adjuster 206 can be referred to the above-mentioned operation when the predetermined number N is equal to 3, so further description thereof is omitted for simplicity.

Then, in Step 310, please simultaneously refer to FIG. 1 and FIG. 4. At the time T4 (corresponding to the ninth valley of the drain voltage VDS), the logic circuit 210 can generate the reset signal RS to the first counter 202 and the second counter 204 and generate the enable signal EM to the gate control signal generation circuit 208 according to the first signal FC, the second signal SC, and the gate control signal GCSM (label "2"), so at the time T4, the first counter 202 and the second counter 204 will be reset to zero according to the reset signal RS, and the gate control signal generation circuit 208 will generate the gate control signal GCSM (label "1") corresponding to the next group NEG according to the enable signal EM. Afterward, if the adjuster 206 does not adjust the predetermined number N, the primary-side controller 200 will repeat the above-mentioned operation of the current group CUG in the next group NEG.

Figure 5:
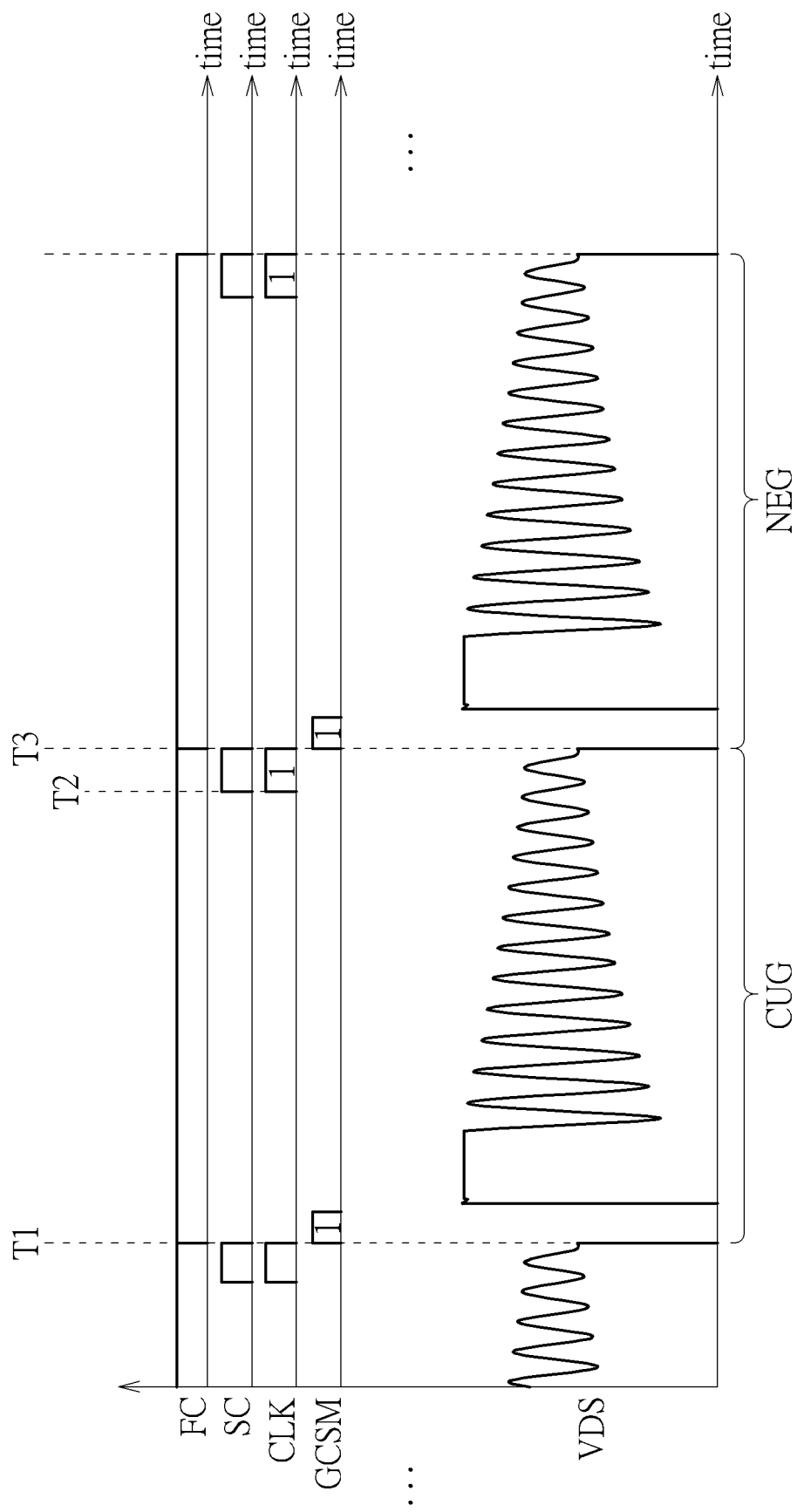

In addition, take the predetermined number N being equal to 1 as an example:

In Step 300, please simultaneously refer to FIG. 1 and FIG. 5. As shown in FIG. 5, at the time T1, the current group CUG starts, so the gate control signal generation circuit 208 generates the gate control signal GCSM (label "1") according to the enable signal EM corresponding to the previous group. In addition, the enable signal EM of the previous group corresponds to the discontinuous conduction mode and further corresponds to a valley (not the first valley) of the drain voltage VDS (e.g. in the previous group, the enable signal EM corresponds to a thirteen valley of the drain voltage VDS).

In Step 304 to Step 308, as shown in FIG. 5, after the time T1, because the predetermined number N is equal to 1 and the first counter 202 has been counted 1 gate control signal GCSM (corresponding to label "1"), the first counter 202 generates the first signal FC. As further shown in FIG. 5, at the time T2, the second counter 204 has been counted 1 clock signal CLK, so the second counter 204 generates the second signal SC. As shown in FIG. 1, the adjuster 206 can determine the average switching frequency according to the second signal SC, the predetermined number N, and the frequency of the clock signal CLK corresponding to the current group CUG (because the predetermined number N is equal to 1, the average switching frequency is equal to the frequency of the clock signal CLK corresponding to the current group CUG), wherein the following operation of the adjuster 206 can be referred to the above-mentioned operation when the predetermined number N is equal to 3, so further description thereof is omitted for simplicity.

Then, in Step 310, please simultaneously refer to FIG. 1 and FIG. 5, at the time T3 (corresponding to the thirteen valley of the drain voltage VDS), the logic circuit 210 can generate the reset signal RS to the first counter 202 and the second counter 204 and generate the enable signal EM to the gate control signal generation circuit 208 according to the first signal FC, the second signal SC, and the gate control signal GCSM (label "1"), so at the time T3, the first counter 202 and the second counter 204 will be reset to zero according to the reset signal RS, and the gate control signal generation circuit 208 will generate the gate control signal GCSM (label "1") corresponding to the next group NEG according to the enable signal EM. Afterward, if the adjuster 206 does not adjust the predetermined number N, the primary-side controller 200 will repeat the above-mentioned operation of the current group CUG in the next group NEG.

Figure 6:
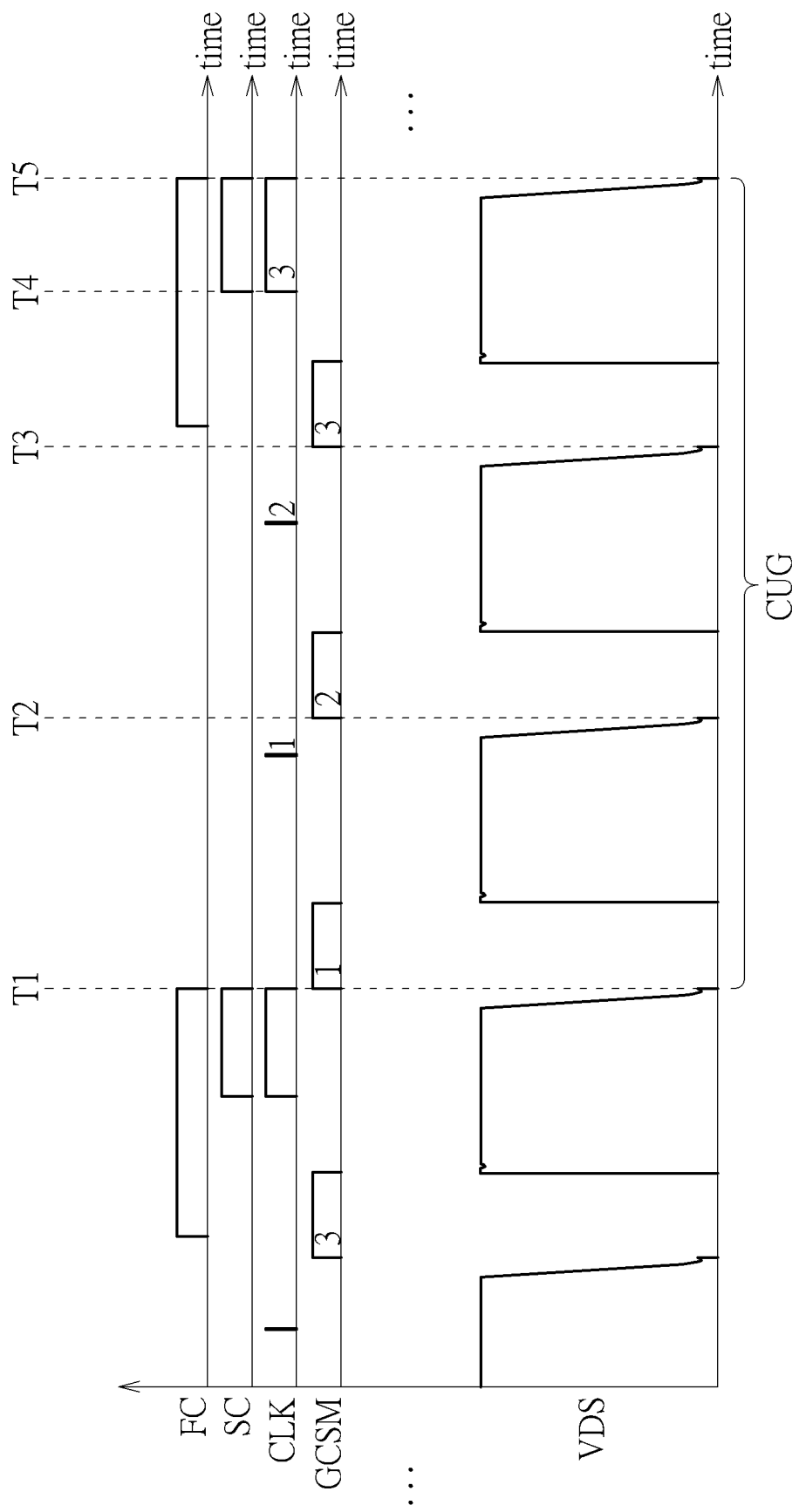

In addition, take the load being heavy and the predetermined number N being equal to 3 as an example:

In Step 300, please simultaneously refer to FIG. 1 and FIG. 6. As shown in FIG. 6, at the time T1, the current group CUG starts, so the gate control signal generation circuit 208 generates the gate control signal GCSM (label "1") according to the enable signal EM of the previous group (corresponding to the first valley of the drain voltage VDS). Similarly, as shown in FIG. 6, at the time T2, the gate control signal generation circuit 208 generates the gate control signal GCSM (label "2") according to the valley detection signal VS, wherein the valley detection signal VS corresponds to the critical conduction mode. Similarly, as shown in FIG. 6, at the time T3, the gate control signal generation circuit 208 generates the gate control signal GCSM (label "3") according to the valley detection signal VS again.

In Step 304 to Step 308, as shown in FIG. 6, after the time T3, because the predetermined number N is equal to 3 and the first counter 202 has been counted 3 gate control signals GCSM (corresponding to label "1", label "2", label "3", respectively), the first counter 202 generates the first signal FC. As further shown in FIG. 6, at the time T4, the second counter 204 has been counted 3 clock signals CLK, so the second counter 204 generates the second signal SC. Meanwhile, because a switching frequency corresponding to the critical conduction mode is determined by the charging and discharging time of the transformer of the power converter 100, the switching frequency corresponding to the critical conduction mode is lower than a frequency determined by the 3 clock signals CLK shown in FIG. 6, that is, the switching frequency corresponding to the critical conduction mode is not controlled by the clock signal CLK.

Then, in Step 310, please simultaneously refer to FIG. 1 and FIG. 6. At the time T5 (corresponding to the first valley of the drain voltage VDS), the logic circuit 210 can generate the reset signal RS to the first counter 202 and the second counter 204 and generate the enable signal EM to the gate control signal generation circuit 208 according to the first signal FC, the second signal SC, and the gate control signal GCSM (label "3"), so at the time T5, the first counter 202 and the second counter 204 will be reset to zero according to the reset signal RS, and the gate control signal generation circuit 208 will generate the gate control signal GCSM (label "1") corresponding to the next group NEG according to the enable signal EM. Afterward, if the adjuster 206 does not adjust the predetermined number N, the primary-side controller 200 will repeat the above-mentioned operation of the current group CUG in the next group NEG.

To sum up, the primary-side controller and the operational method thereof can control the frequency of the gate control signal according to the grouping mode, wherein one of multiple gate control signals in the same group corresponds to the discontinuous conduction mode and other gate control signals of the multiple gate control signals correspond to the critical conduction mode. Therefore, compared to the prior art, the present invention can make the power converter not only realize zero-voltage (or low-voltage) switching when the load is heavy, but also reduce the average switching frequency to increase conversion efficiency of the power converter when the load is light.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A primary-side controller applied to a power converter, wherein the primary-side controller controls a frequency of a gate control signal according to a grouping mode, the primary-side controller comprising:
   a first counter for generating a first signal when a number of multiple gate control signals is equal to a predetermined number;
   a second counter for generating a second signal when a number of multiple clock signals is equal to the predetermined number;
   an adjuster coupled to the second counter, wherein the adjuster detects a frequency of the multiple clock signals and decides whether to adjust the predetermined number according to the second signal, the predetermined number, and the frequency of the multiple clock signals;
   a gate control signal generation circuit for generating the multiple gate control signals; and
   a logic circuit coupled to the first counter, the second counter, and the gate control signal generation circuit, wherein the logic circuit generates a reset signal to the first counter and the second counter and an enable signal to the gate control signal generation circuit accord to the first signal, the second signal, and a last gate control signal of the multiple gate control signals.

2. The primary-side controller of claim 1, wherein the gate control signal generation circuit generates the gate control signal according to a first valley of a drain voltage of a main switch of a primary side of the power converter or the enable signal.

3. The primary-side controller of claim 2, wherein the first valley corresponds to a critical conduction mode (CRM), and the enable signal corresponds to a discontinuous conduction mode (DCM).

4. The primary-side controller of claim 1, wherein the primary-side controller is installed at a primary side of the power converter.

5. The primary-side controller of claim 1, wherein the power converter is an active-clamp flyback (ACF) power converter, or an asymmetric half-bridge (AHB) flyback power converter, or a quasi-resonance flyback power converter, or a zero-voltage switching flyback power converter.

6. The primary-side controller of claim 1, further comprising:

an oscillator coupled to the second counter and the adjuster, wherein the oscillator generates the multiple clock signals according to a feedback compensation voltage.

7. The primary-side controller of claim 1, wherein one of the multiple gate control signals corresponds to a discontinuous conduction mode and other gate control signals of the multiple gate control signals correspond to a critical conduction mode.

8. The primary-side controller of claim 1, wherein when an average switching frequency determined by the predetermined number and the frequency of the multiple clock signals is less than 20 KHz, the adjuster reduces the predetermined number, and when the average switching frequency is greater than 20 KHz, the adjuster increases the predetermined number.

9. The primary-side controller of claim 1, wherein the multiple gate control signals are pulse width modulation (PWM) signals.

10. An operational method of a primary-side controller applied to a power converter, wherein the primary-side controller comprises a first counter, a second counter, an adjuster, a gate control signal generation circuit, and a logic circuit, the operational method comprising:
  starting group counting of gate control signals;
  if an average switching frequency determined by a predetermined number and a frequency of multiple clock signals is greater than a predetermined frequency range when a number of multiple gate control signals is equal to the predetermined number and a number of the multiple clock signals is equal to the predetermined number; and
  adjusting the predetermined number when the average switching frequency is less than the predetermined frequency range.

11. The operational method of claim 10, further comprising:
  starting the group counting of the gate control signal again when the average switching frequency is greater than the predetermined frequency range.

12. The operational method of claim 10, further comprising:
  the gate control signal being generated according to a first valley of a drain voltage when the number of the multiple gate control signals is less than the predetermined number.

13. The operational method of claim 12, wherein the first valley corresponds to a critical conduction mode.

14. The operational method of claim 10, further comprising:
  continuously counting the clock signals when the number of the multiple gate control signals is equal to the predetermined number and the number of the multiple clock signals is less than the predetermined number.

15. The operational method of claim 10, further comprising:
  generating the gate control signal according to an enable signal when the number of the multiple gate control signals is equal to the predetermined number and the number of the multiple clock signals is equal to the predetermined number.

16. The operational method of claim 15, wherein the enable signal corresponds to a discontinuous conduction mode.

17. The operational method of claim 10, wherein one of the multiple gate control signals corresponds to a discontinuous conduction mode and other gate control signals of the multiple gate control signals correspond to a critical conduction mode.

18. The operational method of claim 10, wherein when the average switching frequency is less than 20 KHz, the adjuster reduces the predetermined number and when the average switching frequency is greater than 20 KHz, the adjuster increases the predetermined number.

19. The operational method of claim 10, wherein the multiple gate control signals are pulse width modulation signals.

* * * * *